United States Patent
Watanabe et al.

(10) Patent No.: US 11,539,915 B2
(45) Date of Patent: Dec. 27, 2022

(54) TRANSMISSION CONFIRMATION IN A REMOTE CONFERENCE

(71) Applicant: International Business Machines Corporation, Armonk, NY (US)

(72) Inventors: Takeshi Watanabe, Kawasaki (JP); Akira Saito, Ichikawa (JP); Hayato Uenohara, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/207,607

(22) Filed: Mar. 20, 2021

(65) Prior Publication Data
US 2022/0303500 A1  Sep. 22, 2022

(51) Int. Cl.
H04N 7/15 (2006.01)
H04N 7/14 (2006.01)
H04L 12/18 (2006.01)
G10L 15/26 (2006.01)
G06V 40/16 (2022.01)

(52) U.S. Cl.
CPC ........... H04N 7/147 (2013.01); G06V 40/161 (2022.01); G10L 15/26 (2013.01); H04L 12/1822 (2013.01); H04L 12/1827 (2013.01); H04N 7/15 (2013.01)

(58) Field of Classification Search
CPC ........ H04N 7/147; H04N 7/15; G06V 40/161; G10L 15/26; H04L 12/1822
USPC ........................................................ 709/204
See application file for complete search history.

(56) References Cited

U.S. PATENT DOCUMENTS

| 2015/0139043 | A1 | 5/2015 | Grevers, Jr. |
| 2015/0142884 | A1* | 5/2015 | Veramendi .............. G06F 16/51 709/204 |
| 2019/0333503 | A1* | 10/2019 | Kumetani ............... G06F 3/167 |
| 2020/0036546 | A1 | 1/2020 | Soni |
| 2020/0043479 | A1 | 2/2020 | Mont-Reynaud |

(Continued)

FOREIGN PATENT DOCUMENTS

| JP | 2004171356 A | 6/2004 |
| JP | 2018170009 A | 11/2018 |

OTHER PUBLICATIONS

"2020 Recommended Web & TV Conference System", 2021, 39 pps., <https://kigyolog.com/service.php?id=13>.

(Continued)

Primary Examiner — Sibte H Bukhari
(74) Attorney, Agent, or Firm — Stephanie L. Carusillo

(57) ABSTRACT

Confirming transmission of information in a web conference by determining a presenter of a web conference is providing speech to a second computing device based at least in part on a video data, converting the speech of the presenter to textual data, transmitting information of the second computing device to a third computing device of a participant, wherein the information of the second computing device includes the speech, the textual data, and images of a display of the second computing device, and determining a match level of the information of the second computing device and output information of the third computing device of the participant, wherein the output information of the third computing device correlates with the information of the second computing device.

17 Claims, 4 Drawing Sheets

(56) References Cited

U.S. PATENT DOCUMENTS

2020/0279567 A1  9/2020  Adlersberg

OTHER PUBLICATIONS

"Fresh Voice", Copyright (C) 2012 Anet Co., Ltd., 2 pps., <https://www.freshvoice.net/basic/compare_web_meeting/>.
Mell et al., "The NIST Definition of Cloud Computing", National Institute of Standards and Technology, U.S. Department of Commerce, NIST Special Publication 800-145, Sep. 2011, 7 pages.

* cited by examiner

TRANSMISSION CONFIRMATION IN A REMOTE CONFERENCE

BACKGROUND

The disclosure relates generally to the field of web conferencing. The disclosure relates particularly to confirming transmission of information in a web conference.

Web conferencing is used as an umbrella term for various types of online conferencing and collaborative services including webinars (web seminars), webcasts, and web meetings. In general, web conferencing is made possible by Internet technologies, particularly on Transmission Control Protocol and Internet Protocol (TCP/IP) connections. Services may allow real-time point-to-point communications as well as multicast communications from one sender to many receivers. Additionally, offering data streams of text-based messages, voice and video chat to be shared simultaneously, across geographically dispersed locations. Applications for web conferencing include meetings, training events, lectures, or presentations from a web-connected computer to other web-connected computers.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable confirmation transmission of information in a web conference.

Aspects of the invention disclose methods, systems and computer readable media associated with confirming transmission of information in a web conference by determining a presenter of a web conference is providing speech to a second computing device based at least in part on a video data, converting the speech of the presenter to textual data, transmitting information of the second computing device to a third computing device of a participant, where the information of the second computing device includes the speech, the textual data, and images of a display of the second computing device, and determining a match level of the information of the second computing device and output information of the third computing device of the participant, where the output information of the third computing device correlates with the information of the second computing device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
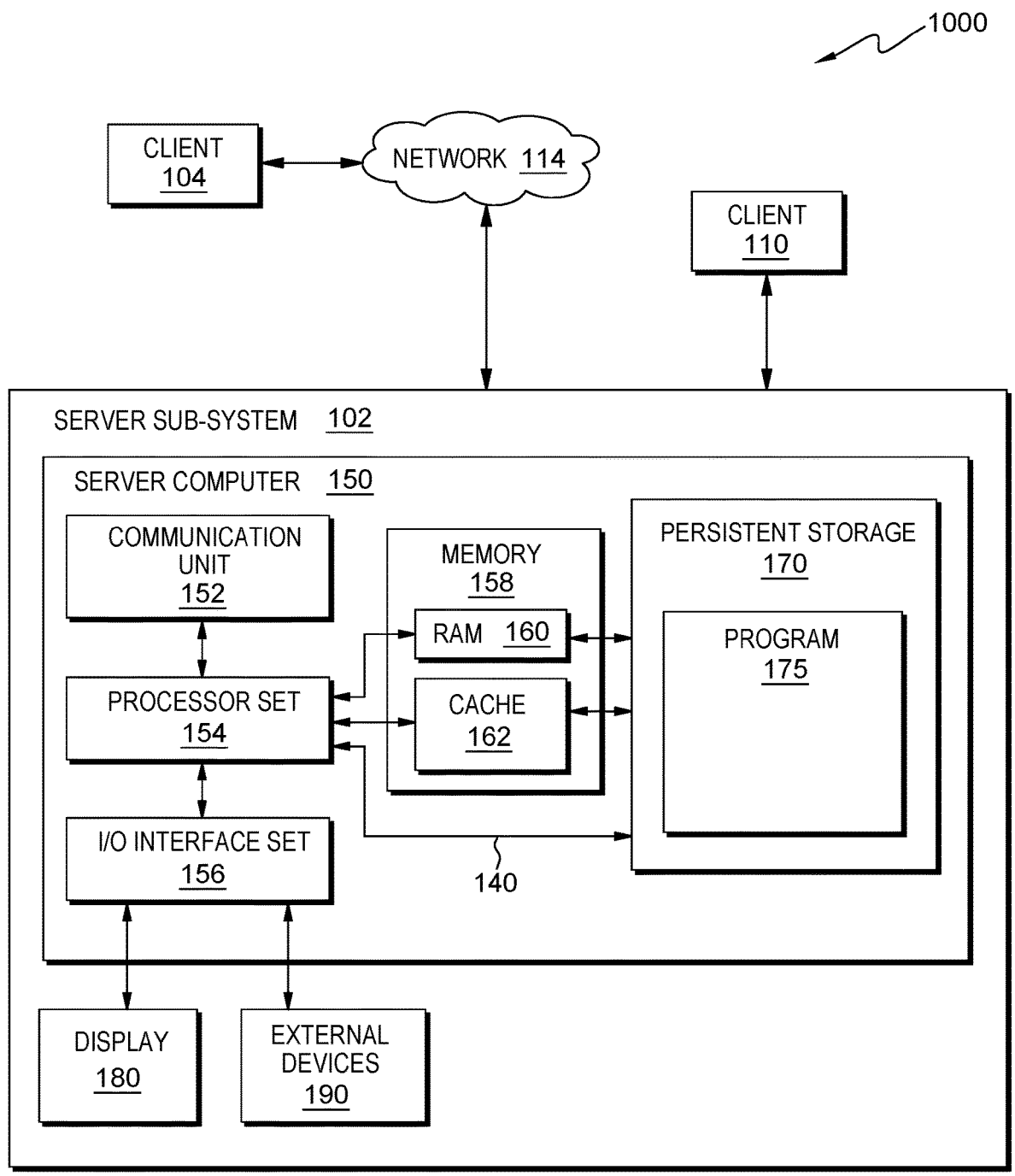
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Networked video conferencing systems are increasingly popular as a simple collaboration tool connecting multiple locations in/across an enterprise. Video conferencing has become an important tool for promoting work style reforms. These conferencing systems may presume that each participant uses a computer or smartphone with built-in camera and microphone. But sometimes a computer in a video conference may fail to transmit information (e.g., speech, text, images, etc.) to multiple participants that attend due to a microphone connection, communication stability, or other problems. Additionally, a problem of inconsistencies may arise between the content explained (e.g., speech) by the presenter and a shared screen of the presenter due to the failure of screen sharing, sharing of wrong screen when the presenter uses multiple screens, or due to transmission problems mentioned previously. In such a case, a speaker (e.g., presenter) may unknowingly continue presenting without realizing that information of a presentation the presenter provides to computing devices of other conference participants receives improperly. Conventional solutions in such cases, other participants often attempt to notify the presenter through means such as calling out to the presenter, sending a message in text, or make gestures to the camera of a computer to provide an analog-like notice of transmission failure, which interrupts the conference. Additionally, other participants may attribute a difficulty in hearing to a connection problem of a participant's computer, thus preventing the participant from notifying to the presenter with confidence. However, due to the absence of means to identify inconsistencies in speech and video data with other participants' applications, the presenter may have to confirm verbally.

Disclosed embodiments enable the determination of transmission of speech and/or inconsistent information of a presenter to participants of a web conference using artificial intelligence models. A trained machine learning model determines a presenter of a web conference is providing speech and a second machine learning model identifies inconsistencies in web conference data the presenter provides. Disclosed embodiments enable confirmation of the matching of content of the speech of the presenter and a screen image. Disclosed embodiments then generate a notification for a user interface of computing devices of the parties of a web conference, which indicates issues with the transmission of information. Disclosed methods automatically identify the computing device of the web conference that has a problem and augment a user interface of computing devices of participants to identifying conditions of the computing device without disrupting the flow of the web conference discussion.

In an embodiment, one or more components of the system can employ hardware and/or software to solve problems that are highly technical in nature (e.g., determining a presenter of a web conference is providing speech to a second computing device based at least in part on a video data, converting the speech of the presenter to textual data, transmitting information of the second computing device to a third computing device of a participant, wherein the information of the second computing device includes the speech, the textual data, and images of a display of the second computing device, determining a match level of the information of the second computing device and output information of the third computing device of the participant, wherein the output information of the third computing device correlates with the information of the second computing device, etc.). These solutions are not abstract and cannot be performed as a set of mental acts by a human due to the processing capabilities needed to facilitate confirming transmission of information in a web conference, for example. Further, some of the processes performed may be performed by a specialized computer for carrying out defined tasks related to buffering web conference information provided to a local computing device. For example, a specialized computer can be employed to carry out tasks related to confirming transmission of information in a web conference or the like.

Implementation of embodiments of the invention may take a variety of forms, and exemplary implementation details are discussed subsequently with reference to the Figures.

In an embodiment, a system executing the web conference information transmission confirmation method determines a presenter of a web conference is providing speech to a computing device. For each prospective meeting attendee, the method receives a set of data identifiers, including for example audio data, video data, system conditions (e.g., volume of speaker and microphone, network condition, shared screen content, etc.), etc. The prospective attendee data further includes at least one facial image of the attendee. In this embodiment, the method receives the data for each prospective attendee as an associated set of data where the video data, and facial image are linked and associated with the prospective attendee. In this embodiment, audio data, video data, computing device conditions, and facial image data are provided by the prospective attendee and used for the disclosed method with the consent of the prospective attendees. The data may be provided to the system executing the methods by the attendees themselves or collected by a meeting/call host and provided as set of attendee data associated with a particular scheduled meeting such that only data associated with the attendees invited for participation at a particular location is provided by the host to the system for use by the method.

The method trains a first machine learning model such as a recurrent neural network (RNN), support vector machine (SVM), or other classification machine learning model architecture, to classify digitized input image according to a human face. The method trains the model to correctly classify the digitized facial image data provided for each prospective attendee. In an embodiment, the method labels a set of facial images that include features corresponding to objects of a class corresponding to human faces and provides the labelled set of images for training the machine learning model. In an embodiment, the method reserves a portion of the labelled set of facial image data for use as test data to validate the trained machine learning model. The trained machine learning model enables the detection of human faces using new unlabeled facial image data of video data. The trained model provides an output that indicates detection of a human face by the trained model from the new input facial image data. The presence of facial image data of the attendee is determined by the method according to the trained model's output. In some instances, the method also trains the first machine learning model for classifying objects (e.g., facial features) of detected human faces of the facial image data.

In an embodiment, the method also trains a second machine learning model for classifying facial image data. The method trains the machine learning model such as a convolutional neural network (CNN), SVM, or similar classification machine learning model architecture, using the provided prospective attendee digitized facial image data. In an embodiment, the method augments the prospective attendee facial image data set by cropping the images yielding partial facial images of the prospective attendees. The trained second machine learning model enables the identification of variations in the mouth shape of the face of each prospective attendee within the digitized frames of new video data over time. In an embodiment, the method reserves a portion of the augmented facial image data set for each prospective attendee for use in validating the trained machine learning model. After identifying an initial mouth shape of the facial image for an attendee in the video frame data, the method tracks variations in pixels associated with the mouth shape of the facial image for the attendee. The presence of movement of the mouth of facial image data of the attendee is determined by the method according to the trained model's output.

The method trains a third machine learning model such as a recurrent neural network (RNN), a variational autoencoder (VAE), or other classification machine learning model architecture, to classify digitized input voice data according to a presenter. The method trains the model to correctly classify the digitized voice data provided for each prospective attendee. In an embodiment, the method augments the original voice data set by parsing the data by individual phonetic units and assembling common combinations of phonetic units for the selected language and provides the augmented voice data set for training the machine learning model. In an embodiment, the method reserves a portion of the voice data for each attendee for use as test data to validate the trained machine learning model. The trained machine learning model enables the conversion of new unlabeled voice data of a prospective attendee to textual data (i.e., Speech-To-Text (STT)). The trained model provides an output of textual data classified by the trained model from the new input voice data.

In an embodiment, the method provides the trained model's output to a segment of a display of a computing device of a presenter which outputs the textual data. The method modifies textual data of the segment of the display of the computing device of the presenter upon receiving additional output textual data of the trained model. Additionally, the method modifies characteristics (e.g., font, color, size, etc.) of textual data of the segment of the display of the computing device of the presenter to alert the presenter.

In an embodiment, the method transmits information a presenter provides to a computing device of a participant. The method transmits information of a computing device of a presenter to a computing device of a participant via Transmission Control Protocol (TCP) and the Internet Protocol (IP). The information includes data such as audio, video, screen image, textual, etc. In this embodiment, the method retrieves input voice data and corresponding textual data stored locally in memory devices of the computing device of the presenter. The voice and textual data are stored in a buffer as the presenter provides the voice and textual data to an input device or just before being sent to an output device. The method reduces the amount of time and effort of the presenter in reproducing the content, which the system performing the method could not transmit, due to an operation error of a remote conference application, a network failure, or a PC setting error/failure (e.g., volume setting error of speaker device and microphone, various device failures, etc.) by retrieving locally stored textual and voice data for transmission to the computing device of the participant.

In an embodiment, the method monitors a set of conditions of a computing system of a presenter. The method remotely monitors a set of conditions via TCP/IP corresponding to settings of components (e.g., microphones, network adapters, speakers, etc.) of a computing device of a presenter. Additionally, the method utilizes a response to a transmitted query to a web conference software application of the computing device of the presenter to determine a mute status and/or whether a screen share function is enabled of the web conference software application. In this embodiment, the method utilizes the set of conditions of the computing system of the presenter to determine a volume level or status of a microphone or speaker device and/or network connection conditions.

In an embodiment, the method monitors a set of conditions of a computing system of a participant. The method remotely monitors a set of conditions via TCP/IP corresponding to settings of components (e.g., microphones, network adapters, speakers, etc.) of a computing device of one or more participants. The method utilizes the set of conditions of the computing system of the one or more participants, which each participant transmits to a system performing the method at regular intervals) to determine a volume level or status of a microphone or speaker device and/or network connection conditions. In this embodiment, the method manages the set of conditions of each participant in a unitary manner. The method utilizes the set of conditions to modify a segment of a display (e.g., graphical user interface (GUI)) of a respective computing device of a presenter and the one or more participants to notify the parties (e.g., participants and presenter) of whether the parties are participating in the conference under normal conditions. In an embodiment, the method collects output information of the computing device of the participant that corresponds to the information the presenter provides to the computing device of the presenter. The method collects the output information from the computing devices of the one or more participants at regular intervals. The output information include images of screen displays of the computing device, which includes screen share images shared by the presenter and textual data corresponding to voice data provided by the presenter.

In an embodiment, the method identifies an inconsistency in information of a computing device of a presenter. The method determines the presenter is providing speech based on the outputs of the second and/or the third trained models' outputs (i.e., presence of movement of the mouth and output of textual data corresponding to input voice data). The method identifies an abnormal condition (e.g., web conference application mute is enabled) of a set of conditions of a computing device of the presenter. Additionally, the method determines that voice data the presenter provides to the computing device of the presenter is not transmitted to participants due to the application disabling audio outputs. The method modifies a performance state of the presenter by assigning a mute status in response to the application disabling audio outputs. As a result, the method retrieves the voice and textual data stored in local memory devices of the computing device of the presenter corresponding to a timeframe speech is detected and when a performance state is changed to "normal" due to a mute function the application being disabled by the presenter. Thereafter, the method transmits the locally stored voice and textual data to computing devices of participants.

Alternatively, the method may identify one or more abnormal conditions (e.g., network failures, devices settings, etc.) of a set of conditions of a computing device of the presenter that result in voice data not being transmitted to participants. When the connection is recovered, the method receives the information of the presenter pushed from a local computing device to the system performing the method so that the information including the speech provided by the presenter is shared with participants, whereby wasteful effort to repeat the same explanation can be eliminated.

The method identifies an abnormal condition (e.g., speaker volume off) of a set of conditions of a computing device of a participant. Additionally, the method determines that voice data a presenter provides to the computing device of the presenter is transmitted to participants. The method modifies a performance state of the computing device of the participant by modifying an audio system status in response to identifying the abnormal condition.

In an embodiment, the method identifies an inconsistency between information of a computing device of a presenter and output information of a computing device of a participant. The method utilizes image matching techniques (e.g., template based, feature based, area based, etc.) to determine whether a digitized image of the screen share content of a presenter and an image of a display of a computing device of a participant receiving screen share content from the presenter match.

The method trains a fourth machine learning model such as a convolutional neural network (CNN), support vector machine (SVM), or other classification machine learning model architecture, to classify digitized input image according to a template image (e.g., presenter image). The method trains the model to correctly classify the digitized image data provided for each prospective attendee. In an embodiment, the method processes a template image by passing the template image through different hidden layers and at each layer produce a vector with classification information about the template image. These vectors are extracted from the CNN and are used as the features of the template image. The trained machine learning model utilizes the hidden layer outputs (e.g., a vector that holds classification information about the template image) and as the features of the image in the Template Matching algorithm to determine a match with the digitized image data provided for each prospective attendee. The trained model provides an output indicates detection of a matched image by the trained model from the digitized image data provided for each prospective attendee. The presence of matched image data of the attendee is determined by the method according to the trained model's output.

In this embodiment, the method provides voice data of the presenter and audio data of a computing device of a participant, which corresponds to the voice data, to the third trained machine learning model, which enables STT conversion of new unlabeled voice data of one or more parties (e.g., presenter and participant). The trained model provides an output of textual data classified by the trained model from the input voice data of the presenter and audio data of the computing device of the participant.

The method uses a generative statistical model (e.g., latent Dirichlet allocation (LDA)) that classifies a textual data of the STT algorithm to a particular topic and generates a topic per sentence model as well as a words per topic model, modeled as Dirichlet distributions. The method also utilizes a bag-of-words (BOW) model to represent the words (e.g., textual data) of the output of the STT algorithm as a bag (e.g., multiset) of words of the comment along with occurrence (e.g., frequency of) of each word, which are used as a feature for training a classifier (e.g., LDA). A topic has probabilities of generating various words that can be classified and interpreted as related to a topic. A topic is identified based on automatic detection of the likelihood of term co-occurrence. A lexical word may occur in several topics with a different probability, however, with a different typical set of neighboring words in each topic. The method utilizes the generative statistical model to determine whether a topic (e.g., classification) of the textual output corresponding to the voice data of the user and a topic the audio data of the computing device of the participant match.

In an embodiment, the method identifies an inconsistency between information of a computing device of a presenter and output information of a computing device of a participant. The method utilizes optical character recognition (OCR), third machine learning algorithm, and the generative statistical model to determine whether a topic of voice data of a presenter and a digitized image of a display of a computing device of a participant receiving screen share content from the presenter match. The method utilizes the OCR to extract title, text content, and page number from the digitized image of the screen share content. Additionally, the method passes the voice data of the presenter to the third machine learning algorithm that outputs textual data corresponding to the voice data that the method selects. Furthermore, the method passes the textual data corresponding to the voice data and the textual data of the digitized image of the screen share content to the generative statistical model to determine whether the classifications (e.g., topics) of the respective textual data matches (i.e., determines whether the topics of text of the voice data and the screen share content are related).

In an embodiment, the method determines a match level between information of a computing device of a presenter and output information of a computing device of a participant. The method uses confidence values of algorithm outputs to determine match levels such as voice data of presenter to output audio of participant, screen share image matches of participant and presenter, and topic of voice data of presenter and topic of screen share image content of the participant.

In an embodiment, the method generates a notification to attendees. The method transmits a notification to a computing device of a presenter corresponding to an identified inconsistency. The method provides the notification to the presenter via a graphical user interface of a display of the computing device or as an audible sound, which can include a generated warning message. The method can modify features (e.g., text) of the graphical user interface (e.g., icon, match meter, participant panel) of the display of the computing device of presenter according to a performance state of the computing device of the presenter or a computing device of a participant. For example, the method can modify the color of text displayed to a presenter based on an assigned state (e.g., warning state, normal state) of the computing device of the presenter. The notification can include an alert that corresponds to an enabled mute function (e.g., performance state) of the computing device of the presenter. Additionally, the method can transmit notification to each participant based on system conditions of respective computing devices of each participant.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program (not shown) together with sufficient computing resource (processor, memory, network communications hardware) to execute the program.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment may be made by those skilled in the art without departing from the scope of the invention as recited by the claims.

The present invention may contain various accessible data sources, such as memory 158, persistent storage 170, client 104 and client 110, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 175 enables the authorized and secure processing of personal data. Program 175 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program 175 provides information regarding personal data and the nature (e.g., type, scope, purpose, duration, etc.) of the processing. Program 175 provides the user with copies of stored personal data. Program 175 allows the correction or completion of incorrect or incomplete personal data. Program 175 allows the immediate deletion of personal data.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
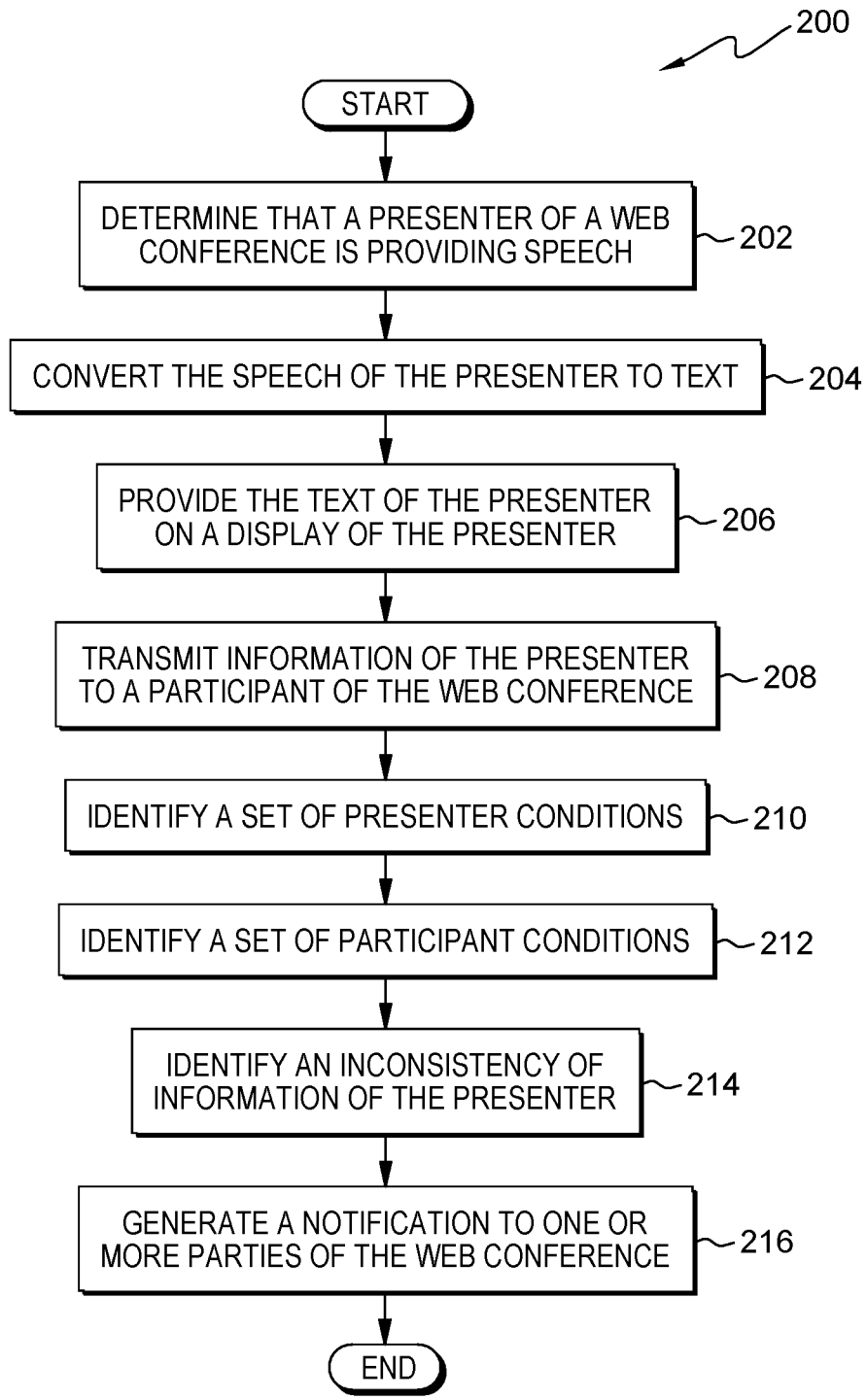
FIG. 2 provides a flowchart depicting an operational sequence, according to an embodiment of the invention.

FIG. 2 provides a flowchart 200, illustrating exemplary activities associated with the practice of the disclosure. In one embodiment, program 175 initiates in response to a user connecting devices (e.g., client 104 and client 110) to program 175 through network 114. For example, program 175 initiates in response to a user registering (e.g., opting-in) a laptop (e.g., client 110) with program 175 via a WLAN (e.g., network 114). In another embodiment, program 175 is a background application that continuously monitors devices (e.g., client 104 and client 110). For example, program 175 initiates upon each attendee of a web conference attempting connect to a web conference server (e.g., server computer 150) to participate in the web conference.

After program start, at block 202, the method of program 175 receives input audio and video data, such as audio from a digital microphone and video data from a digital camera. The digital video data from the digital camera passes to the first trained machine learning model to detect a face of a presenter. After the first machine learning model indicates the face of the presenter is present, the method passes facial image data associated with that presenter to a second machine learning model to detect movement of the mouth of the presenter. After a determination that the user is providing speech based on the output of the second machine learning algorithm, the method proceeds to block 204 and converts the speech of the presenter to textual data utilizing a third machine learning algorithm.

At block 206, the method of program 175 provides the textual data of the presenter to a display of the computing device of the presenter. The textual data is added to a segment of the display of the computing device of the presenter. Additionally, the textual data and speech of audio data the presenter provides is stored in a memory device of the computing device.

At block 208, the method of program 175 transmits information of the presenter to a participant of a web conference. The information can include textual data, audio data, video data, and screen share content of the presenter device. In an embodiment, the method of program 175 receives the textual data and/or video data stored locally on the computing device of the presenter in response to identifying an inconsistency or an abnormal performance state.

At block 210, the method of program 175 identifies a set of conditions corresponding to the computing device of the presenter. The method receives network conditions, device settings, and application function status of the computing device of the presenter, transmitted at regular intervals to the method. In an embodiment, the method of program 175 queries a computing device of the presenter for a status of a system condition or device setting.

At block 212, the method of program 175 identifies a set of conditions corresponding to the computing device of the participant. The method receives network conditions, device settings, and application function status of the computing device of the participant, transmitted at regular intervals to the method. In an embodiment, the method of program 175 queries a computing device of the participant for a status of a system condition or device setting.

At block 214, the method of program 175 identifies an inconsistency of provided information of the presenter and output information the participant. The method utilizes system conditions of the presenter to determine whether the participant is receiving the information the presenter provides based on a status of a mute function of the presenter. In an embodiment, the method can utilize microphone settings, speaker settings, network conditions, etc. of the presenter or the participant to determine whether the information provided by the presenter is consistent with the output information of the participant. The identified inconsistency can correspond to screen share content, speech, or topics of textual data the computing device of the presenter provides and the computing device of the participant outputs. After a determination that an inconsistency of provided information of the presenter and output information the participant is present, the method proceeds to block 216 and generates a notification to one or more parties of the web conference. In an embodiment, the method determines a match level of the information of the presenter and output information the participant to confirm transmission of presenter information to the participant.

At block 216, the method of program 175, provides audio and visual alerts to a presenter and/or participant of a web conference. In an embodiment, the method transmits a notification to a computing device of a party based on conditions corresponding to an identified inconsistency. In this embodiment, the method provides the notification to one or more elements of a graphical user interface of a computing device of a participant and/or presenter.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

In an embodiment, the method of program 175 utilizes cloud resources to perform computational task associated with one or more machine learning models. Additionally, the method of program 175 can be hosted as an application on a cloud infrastructure in order to monitor participants of a web conference to the distributed nature of the participants and transmission of notifications across the distributed participants.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
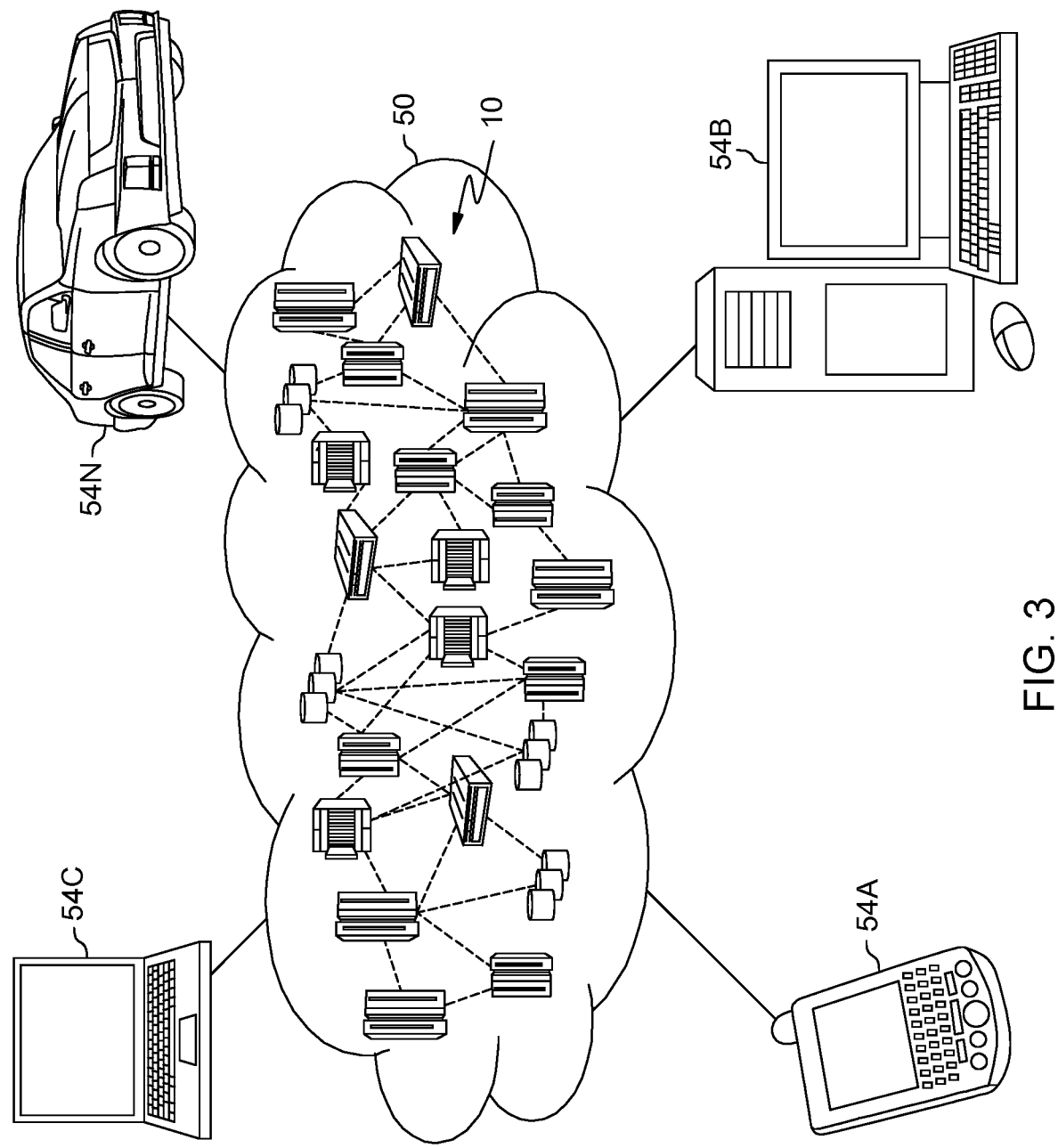
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
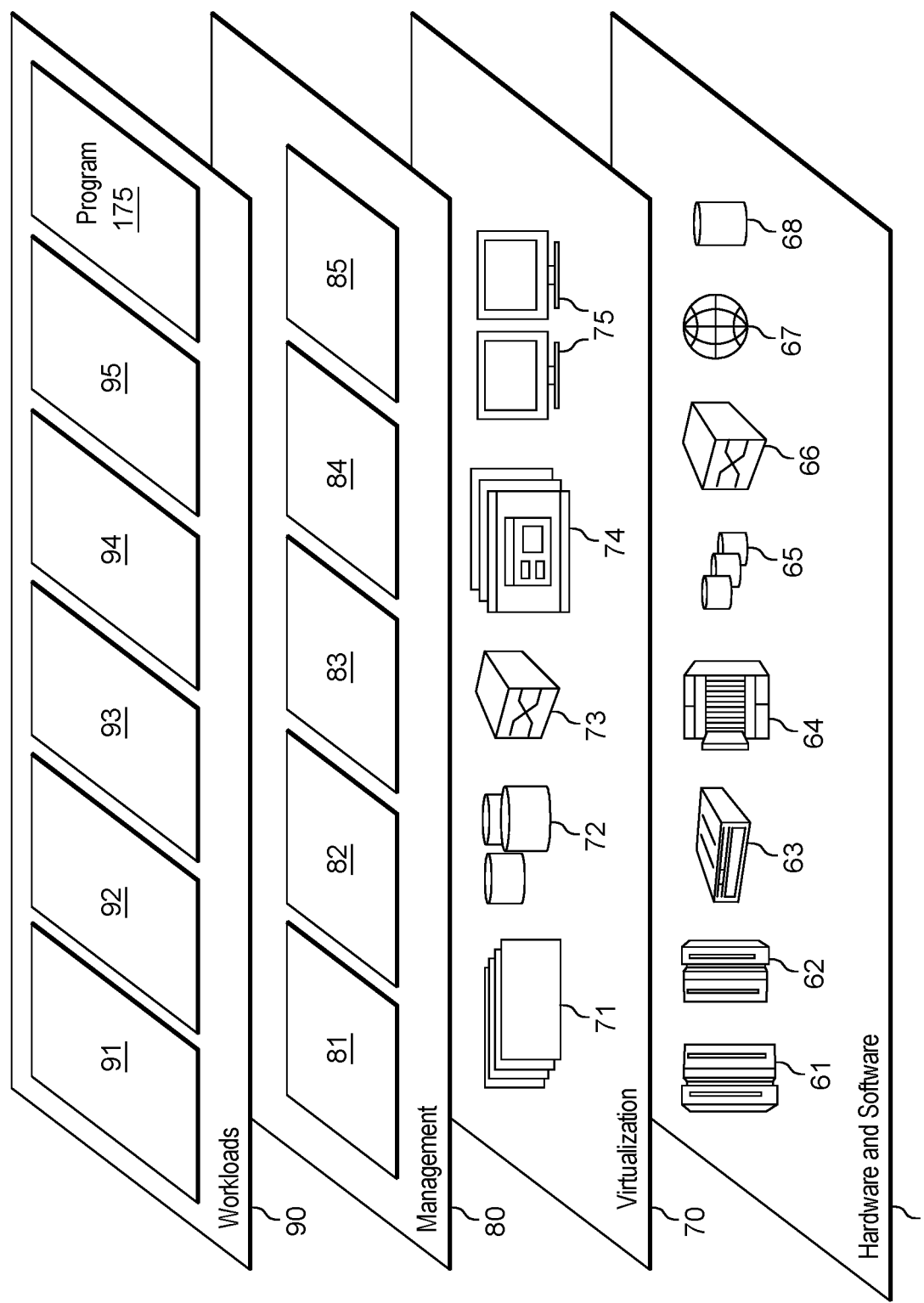
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, a electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for confirming transmission of information in a web conference, the method comprising:

determining, by a first computing device, a presenter of a web conference is providing speech to a second computing device based at least in part on a video data;

converting, by the first computing device, the speech of the presenter to textual data;

transmitting, by the first computing device, information of the second computing device to a third computing device of a participant, wherein the information of the second computing device includes the speech, the textual data, and images of a display of the second computing device;

determining, by the first computing device, a match level of the information of the second computing device and output information of the third computing device of the participant, wherein the output information of the third computing device correlates with the information of the second computing device; and generating, by the first computing device, a notification to one or more parties of the web conference, wherein the notification corresponds to the determined match level, wherein the one or more parties is selected from at least one of the presenter and the participant.

2. The computer implemented method according to claim 1, wherein generating the notification to the one or more parties of the web conference further comprises:

determining, by the first computing device, a set of conditions of the third computing device of the participant, wherein the set of conditions correspond to the output information of the third computing device; and updating, by the first computing device, the notification to the one or more parties of the web conference based at least in part on the set of conditions.

3. The computer implemented method according to claim 1, wherein generating the notification to the one or more parties of the web conference further comprises:

in response to determining that the third computing device of the participant does not receive the information of the second computing device, modifying, by the first computing device, a performance state of the one or more parties; and storing, by the first computing device, the information of the second computing device locally.

4. The computer implemented method according to claim 1, wherein determining the presenter of the web conference is providing speech to the first computing device based at least in part on the video data, further comprises:

identifying, by the first computing device, a segment of a face of the presenter associated with speech in images of the video data; and determining, by the first computing device, whether extracted features of the images of the video data corresponding to the segment of the face of the presenter indicate movement.

5. The computer implemented method according to claim 1, wherein determining the match level of the information of the second computing device and the output information of the third computing device of the participant, further comprises:

extracting, by the first computing device, textual data of the image of the display of the second computing device; and comparing, by the first computing device, the extracted textual data of the image of the display and a textual representation of the speech of the presenter from the output information of the third computing device of the participant.

6. The computer implemented method according to claim 1, wherein determining the match level of the information of the second computing device and the output information of the third computing device of the participant further, comprises:

comparing, by the first computing device, the image of the display of the second computing device of the presenter and an image of a display of the third computing device of the participant.

7. A computer program product for confirming transmission of information in a web conference, the computer program product comprising one or more computer readable storage devices and collectively stored program instructions on the one or more computer readable storage devices, the stored program instructions comprising:

program instructions to determine a presenter of a web conference is providing speech to a second computing device based at least in part on a video data;

program instructions to convert the speech of the presenter to textual data;

program instructions to transmit information of the second computing device to a third computing device of a participant, wherein the information of the second computing device includes the speech, the textual data, and images of a display of the second computing device;

program instructions to determine a match level of the information of the second computing device and output information of the third computing device of the participant, wherein the output information of the third computing device correlates with the information of the second computing device; and program instructions to generate a notification to one or more parties of the web conference, wherein the notification corresponds to the determined match level, wherein the one or more parties is selected from at least one of the presenter and the participant.

8. The computer program product according to claim 7, wherein the stored program instructions to generate the notification to the one or more parties of the web conference, further comprises:

program instructions to determine a set of conditions of the third computing device of the participant, wherein the set of conditions correspond to the output information of the third computing device; and program instructions to update the notification to the one or more parties of the web conference based at least in part on the set of conditions.

9. The computer program product according to claim 7, the stored program instructions to generate the notification to the one or more parties of the web conference, further comprises:

in response to determining that the third computing device of the participant does not receive the information of the second computing device, program instruction to modify a performance state of the one or more parties; and program instruction to store the information of the second computing device locally.

10. The computer program product according to claim 7, wherein determining the presenter of the web conference is providing speech to the first computing device based at least in part on the video data, further comprises:

program instruction to identify a segment of a face of the presenter associated with speech in images of the video data; and program instruction to determine whether extracted features of the images of the video data corresponding to the segment of the face of the presenter indicate movement.

11. The computer program product according to claim 7, wherein determining the match level of the information of the second computing device and the output information of the third computing device of the participant, further comprises:

program instruction to extract textual data of the image of the display of the second computing device; and program instruction to compare the extracted textual data of the image of the display and a textual representation of the speech of the presenter from the output information of the third computing device of the participant.

12. The computer program product according to claim 7, wherein determining the match level of the information of the second computing device and the output information of the third computing device of the participant, further comprises:

program instruction to compare the image of the display of the second computing device of the presenter and an image of a display of the third computing device of the participant.

13. A computer system for confirming transmission of information in a web conference, the computer system comprising:

one or more computer processors;

one or more computer readable storage devices; and stored program instructions on the one or more computer readable storage devices for execution by the one or more computer processors, the stored program instructions comprising:

program instructions to determine a presenter of a web conference is providing speech to a second computing device based at least in part on a video data;

program instructions to convert the speech of the presenter to textual data;

program instructions to transmit information of the second computing device to a third computing device of a participant, wherein the information of the second computing device includes the speech, the textual data, and images of a display of the second computing device;

program instructions to determine a match level of the information of the second computing device and output information of the third computing device of the participant, wherein the output information of the third computing device correlates with the information of the second computing device; and program instructions to generate a notification to one or more parties of the web conference, wherein the notification corresponds to the determined match level, wherein the one or more parties is selected from at least one of the presenter and the participant.

14. The computer system according to claim 13, wherein the stored program instructions to generate the notification to the one or more parties of the web conference, further comprises:

program instructions to determine a set of conditions of the third computing device of the participant, wherein the set of conditions correspond to the output information of the third computing device; and program instructions to update the notification to the one or more parties of the web conference based at least in part on the set of conditions.

15. The computer system according to claim 13, the stored program instructions to generate the notification to the one or more parties of the web conference, further comprises:

in response to determining that the third computing device of the participant does not receive the information of the second computing device, program instruction to modify a performance state of the one or more parties; and program instruction to store the information of the second computing device locally.

16. The computer system according to claim 13, wherein determining the presenter of the web conference is providing speech to the first computing device based at least in part on the video data, further comprises:

program instruction to identify a segment of a face of the presenter associated with speech in images of the video data; and program instruction to determine whether extracted features of the images of the video data corresponding to the segment of the face of the presenter indicate movement.

17. The computer system according to claim 13, wherein determining the match level of the information of the second computing device and the output information of the third computing device of the participant, further comprises:

program instruction to extract textual data of the image of the display of the second computing device; and program instruction to compare the extracted textual data of the image of the display and a textual representation of the speech of the presenter from the output information of the third computing device of the participant.

\* \* \* \* \*